United States Patent Office 2,920,112
Patented Jan. 5, 1960

2,920,112

SYNTHESIS OF 2-CHLORO-1,1,1,2-TETRA-FLUOROETHANE

Eric R. Larsen, Midland, Mich., assignor to The Dow Chemical Company, Midland, Mich., a corporation of Delaware No Drawing. Application September 3, 1958
Serial No. 758,684

6 Claims. (Cl. 260—653)

This invention relates to an organic chemical process and is more particularly concerned with an improved synthesis of 2-chloro-1,1,1,2-tetrafluoroethane.

The reduction of 3,3-dichlorohexafluoropropane with zinc dust in ethyl alcohol at 50° C. has given an 80 percent yield of 1,1,1,2,2,3-hexafluorochloropropane along with 12 percent of 1,2,3,3,3-pentafluoropropene-1. However, when 1,1-dichlorotetrafluoroethane was treated under the same conditions, no reaction of any kind occurred. Even with the substitution of isopropyl alcohol for the ethyl alcohol under the same conditions, no reaction was observed.

It is, therefore, a principal object of the present invention to provide a process for the preparation of 2-chloro-1,1,1,2-tetrafluoroethane from 1,1 - dichlorotetrafluoroethane in a highly specific manner with little production of undesirable olefinic or other by-products.

Another object of the present invention is the provision of a process which includes contacting an organic active hydrogen source and an active metal selected from the group consisting of zinc, magnesium, and calcium, with 1,1-dichlorotetrafluoroethane at a temperature from about 50° to about 180° C. and under autogenous pressure in a closed vessel, and separating 2-chloro-1,1,1,2-tetrafluoroethane from the reaction mixture.

The process of the present invention includes contacting 1,1-dichloro-1,2,2,2-tetrafluoroethane with an alcohol or formamide in the presence of an active metal selected from the group consisting of zinc, magnesium, and calcium. The metal may be in various states of subdivision as, for example, dust, granular, or small chunks. While isopropyl alcohol is generally used as the active hydrogen source, other active hydrogen compounds such as, for example, formamide, n-propyl alcohol, ethyl alcohol, methyl alcohol, and mixtures thereof, may be employed.

The molar ratio of metal to 1,1-dichloro-1,2,2,2-tetrafluoroethane may be from 1:5 to 5:1, but is preferably from 1:2 to 1:4. The molar ratio of metal to active hydrogen compound may vary from 1:1 to 1:150, but is preferably within the range of 1:2 to 1:30. The molar ratio of 1,1-dichloro-1,2,2,2-tetrafluoroethane to active hydrogen compound may be from 10:1 to 1:150, but is preferably within the range of 1:2 to 1:30.

The temperature employed may be in the range from about 50° C. to about 180° C. when calcium or magnesium are used, and in the range from about 90° C. to 180° C. when zinc is used, preferably from about 110° C. to about 140° C. when any of the three metals are used. The pressure may be atmospheric or superatmospheric, and is generally autogenous. Autogenous pressure or slightly less pressure is preferred as resulting in a reasonable reaction time, however, atmospheric pressure will provide a reaction, although requiring a longer reaction time to obtain economical yields of the desired chlorofluoroethane. The reaction time may vary from 1 to 36 hours, however, 2 to 16 hours is preferable. The reaction time will vary with the metal used and the state of subdivision of the metal as well as temperature, pressure, and active hydrogen source used. Generally, using 30 mesh zinc and isopropyl alcohol at a temperature of about 120° C. and under autogenous pressure, the reaction is substantially complete within 8 hours. Gaseous reaction products are bled from the reactor, while at an elevated temperature, and collected in a cold trap, such as, for example, a Dry Ice-acetone cold trap. 2-chloro-1,1,1,2-tetrafluoroethane has a boiling point in the range of about −12° C. to about −8° C. and can be separated from other gaseous reaction products by fractionation.

The process of the present invention may be further illustrated, but is not to be construed as limited, by the following examples:

*Example I*

A three-gallon stirred autoclave was charged with 15.1 moles of 30 mesh zinc, 65 moles of isopropyl alcohol, and 10.0 moles of $CF_3CFCl_2$. The stirred mixture was heated to about 120° C. under autogenous pressure (about 110–124 p.s.i.g.) for a period of eight hours. Gaseous product was bled from the heated (85–90° C.) reactor through a train consisting of a water scrubber, $CaCl_2$-filled drying tower, and a Dry Ice-acetone cooled trap. Organic product collected in the Dry Ice-acetone cooled trap in the amount of 1224 grams upon fractional distillation resulted in three fractions, 0.43 mole of $CF_2{=}CHF$, 5.68 moles of $CF_3CHClF$, and 2.03 moles of $CF_3CFCl_2$. This corresponds to an organic recovery of 81.4 percent, a conversion of 56.8 percent, and a yield of 71.5 percent of 2-chloro-1,1,1,2-tetrafluoroethane. The ratio of reduced product to olefinic by-product is about 13 to 1.

*Example II*

A two-liter, stirred autoclave was charged with 4.0 moles of zinc, 2.30 moles of isopropyl alcohol, 13.7 moles of ethyl alcohol, and 3.95 moles of $CF_3CFCl_2$. The reactor was heated to a temperature of 110°–135° C. under autogenous pressure (160–300 p.s.i.g.), for a period of 2.75 hours and the product removed from the autoclave as in Example I. Recovery of the unconsumed zinc indicated a conversion of 64.5 percent, while titration of the chloride ion indicated a conversion of 65 percent. Distillation of the crude product showed a trace of olefinic material ($CF_2{=}CHF$), 2.5 moles of $CF_3CHClF$ and 0.66 mole of $CF_3CFCl_2$. This corresponds to an organic recovery of 80 percent, a conversion of 64 percent, and a yield of 76 percent of 2-chloro-1,1,1,2-tetrafluoroethane.

In a manner similar to the above examples, the reaction may be carried out with substantially the same results by substituting magnesium, calcium or any mixture of zinc, magnesium or calcium for the zinc, and substituting formamide, methyl alcohol, ethyl alcohol, n-propyl alcohol, or mixtures thereof as the active hydrogen source for the isopropyl alcohol.

Various modifications may be made in the present invention without departing from the spirit or scope thereof, and it is to be understood that we limit ourselves only as defined in the appended claims.

What is claimed is:

1. A process for the preparation of 2-chloro-1,1,1,2-tetrafluoroethane which includes contacting 1,1-dichloro-1,2,2,2-tetrafluoroethane with an active-hydrogen source selected from the group consisting of formamide and alcohols containing from 1 to 3 carbon atoms in the presence of an active metal selected from the group consisting of zinc, magnesium, and calcium, and at a temperature from about 50° to about 180° C., when the active metal is a member of the group consisting of calcium and magnesium, and at a temperature of from about 90° to 180° C. when the active metal is zinc, and, separating 2-chloro-1,1,1,2-tetrafluoroethane from the reaction mixture.

2. A process for the preparation of 2-chloro-1,1,1,2-tetrafluoroethane which includes contacting 1,1-dichloro-1,2,2,2-tetrafluoroethane with isopropyl alcohol in the presence of an active metal selected from the group consisting of zinc, magnesium and calcium, and at a temperature from about 50° to about 180° C., when the active metal is a member of the group consisting of calcium and magnesium, and at a temperature of from about 90° to 180° C. when the active metal is zinc, and under autogenous pressure, and, separating 2-chloro-1,1,1,2-tetrafluoroethane from the reaction mixture.

3. A process for the preparation of 2-chloro-1,1,1,2-tetrafluoroethane which includes contacting 1,1-dichloro-1,2,2,2-tetrafluoroethane with isopropyl alcohol in the presence of an active metal selected from the group consisting of zinc, magnesium, and calcium, and at a temperature from about 110° C. to about 130° C. and under autogenous pressure, and, separating 2 - chloro-1,1,1,2-tetrafluoroethane from the reaction mixture.

4. A process for the preparation of 2-chloro-1,1,1,2-tetrafluoroethane which includes contacting 1,1-dichloro-1,2,2,2-tetrafluoroethane with isopropyl alcohol in the presence of zinc, and at a temperature from about 110° C. to about 130° C., and under autogenous pressure, and, separating 2-chloro-1,1,1,2-tetrafluoroethane from the reaction mixture.

5. A process for the preparation of 2-chloro-1,1,1,2-tetrafluoroethane which includes contacting 1,1-dichloro-1,2,2,2-tetrafluoroethane with a member of the group selected from formamide and alcohols containing from 1 to 3 carbon atoms in the presence of zinc, and at a temperature from about 90° C. to about 180° C., and under autogenous pressure, and, separating 2-chloro-1,1,1,2-tetrafluoroethane from the reaction mixture.

6. A process for the preparation of 2-chloro-1,1,1,2-tetrafluoroethane which includes contacting 1,1-dichloro-1,2,2,2-tetrafluoroethane with a member of the group selected from formamide and alcohols containing from 1 to 3 carbon atoms in the presence of zinc, and at a temperature from about 110° C. to about 130° C., and under autogenous pressure, and, separating 2-chloro-1,1,1,2-tetrafluoroethane from the reaction mixture.

References Cited in the file of this patent

Haszeldine et al.: Jour. Chem. Soc. (London), April 1953, pp. 1199–1206, only p. 1201 needed.

Haszeldine et al.: Jour. Chem. Soc. (London), May 1953, pp. 1592–1600, only p. 1596 needed.